United States Patent
Mizobata et al.

(10) Patent No.: US 10,279,774 B2
(45) Date of Patent: May 7, 2019

(54) BACK FRAME STRUCTURE FOR VEHICLE SEAT

(71) Applicant: TOYOTA BOSHOKU KABUSHIKI KAISHA, Aichi-ken (JP)

(72) Inventors: Hiroshi Mizobata, Aichi-ken (JP); Hiroyuki Suzuki, Aichi-ken (JP); Fumitoshi Akaike, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 93 days.

(21) Appl. No.: 15/598,495

(22) Filed: May 18, 2017

(65) Prior Publication Data
US 2017/0341622 A1    Nov. 30, 2017

(30) Foreign Application Priority Data
May 25, 2016    (JP) .................... 2016-104018

(51) Int. Cl.
*B60N 2/68*    (2006.01)
*B60R 22/26*    (2006.01)
*B60R 22/18*    (2006.01)

(52) U.S. Cl.
CPC ............... *B60R 22/26* (2013.01); *B60N 2/68* (2013.01); *B60R 2022/1818* (2013.01)

(58) Field of Classification Search
CPC .... B60R 22/26; B60R 2022/1818; B60N 2/68
USPC .................................................. 297/452.18
See application file for complete search history.

(56) References Cited

U.S. PATENT DOCUMENTS

| | | | | |
|---|---|---|---|---|
| 6,338,529 B1 * | 1/2002 | David | ............... | B60N 2/286 297/250.1 |
| 2002/0130537 A1 * | 9/2002 | Lotspih | ............ | B60R 21/23138 297/216.13 |
| 2008/0296941 A1 * | 12/2008 | Bederka | .............. | B60R 21/207 297/216.1 |
| 2013/0009431 A1 * | 1/2013 | Acker | ................ | B60R 21/207 297/216.13 |
| 2013/0221725 A1 * | 8/2013 | Yamada | ............... | B60N 2/682 297/452.18 |
| 2014/0103690 A1 * | 4/2014 | Haller | ................ | B60N 2/2222 297/301.1 |
| 2014/0232162 A1 | 8/2014 | Mitsuhashi | | |

FOREIGN PATENT DOCUMENTS

JP    2014-156212    8/2014

* cited by examiner

*Primary Examiner* — Mark R Wendell
(74) *Attorney, Agent, or Firm* — Greenblum & Bernstein, P.L.C.

(57) ABSTRACT

A back frame structure for a vehicle seat includes a side frame extending in an up-down direction, wherein a webbing is disposed in the vehicle seat, and in a plan view, a direction along which a geometrical-moment of inertia of the side frame is at a maximum inclines toward an inner side of the vehicle seat with respect to a front-rear direction.

23 Claims, 9 Drawing Sheets

BACK FRAME STRUCTURE FOR VEHICLE SEAT

INCORPORATION BY REFERENCE

The disclosure of Japanese Patent Application No. 2016-104018 filed on May 25, 2016 including the specification, drawings and abstract is incorporated herein by reference in its entirety.

BACKGROUND

1. Technical Field

The disclosure relates to a back frame structure for a vehicle seat to be provided in vehicles such as an automobile, an airplane, a ship, and a train.

2. Description of Related Art

As one of back frame structures for a vehicle seat, there is such a back frame structure in which a gate-shaped back frame having a generally reverse U-shape in a front view and serving as a framework of a seatback is formed such that upper end sides of a pair of side frames extending in an up-down direction are connected by an upper frame in a bridged manner. A back frame of this type as described in Japanese Patent Application Publication No. 2014-156212 (JP 2014-156212 A) is a back frame for an automobile seat with a built-in three point seat belt. In the back frame structure of JP 2014-156212 A, an upper end of a high-strength side frame is connected to an upper end of a normal-strength side frame by an upper frame. The high-strength side frame is on a side where a load from the seat belt is directly applied and the normal-strength side frame is on the other side. A webbing guide is attached to the upper end of the high-strength side frame. The webbing guide is a member configured to guide a webbing let out from a webbing winding apparatus of a seat belt system disposed inside the seatback so as to extend from a back-face side of the back frame toward a front-face side thereof.

SUMMARY

Figure 10:
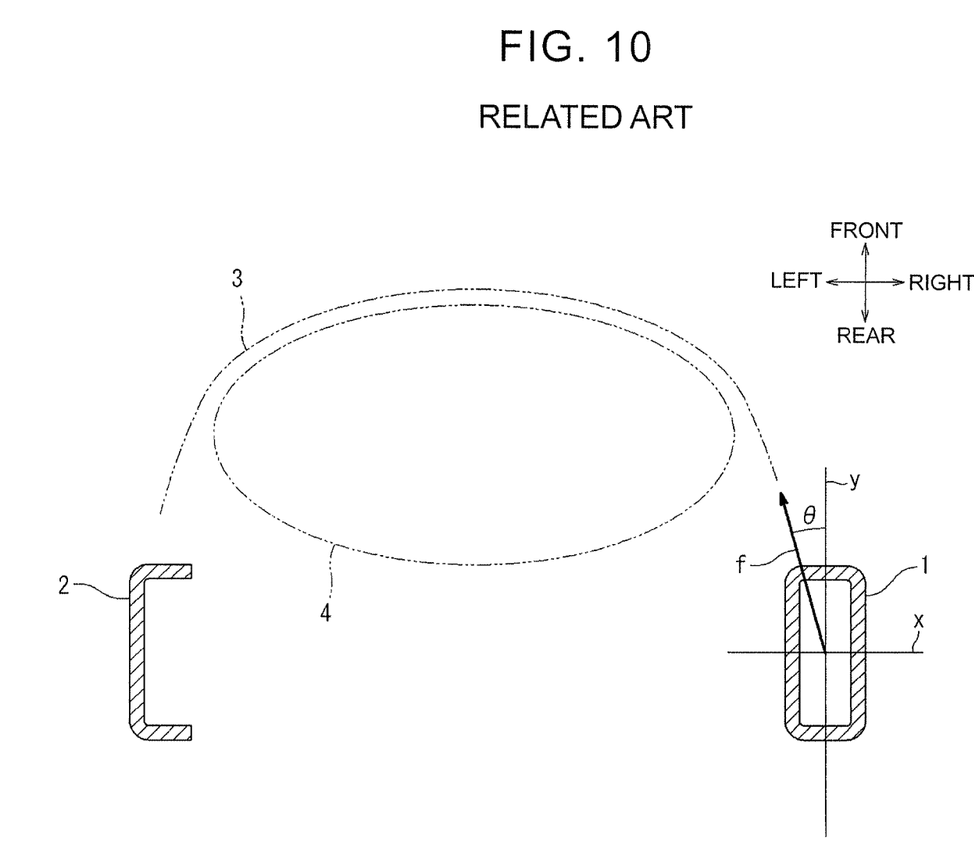
FIG. 10 is a schematic view illustrating a state where a force is applied to a back frame for an automobile seat of the related art from a webbing of a seat belt.

In the above structure, a load is applied to the high-strength side frame from a sitting occupant at the time of a front collision of the automobile and a direction of the load deviates, by a predetermined angle, from a principal axis of section in a cross section of the high-strength side frame. This is because a physical position of the sitting occupant deviates from the high-strength side frame toward a seat inward direction. This will be described with reference to the drawings. As illustrated in FIG. 10, at the time of a front collision of the automobile, a load f directed in a diagonally forward direction is applied from a sitting occupant 4 to a high-strength side frame 1 extending in an up-down direction via a webbing 3 of a seat belt system. A cross section of the high-strength side frame 1, which is a horizontal section, has a generally rectangular shape, and a strong axis y, which is a principal axis of section along which a geometrical-moment of inertia is at a maximum, is placed along a front-rear direction, while a weak axis x, which is the other principal axis of section, is placed along a right-left direction. A direction where the load f is applied is inclined from the strong axis y only by an angle of θ toward an inner side of the seat in the right-left direction. Hereby, a geometrical-moment of inertia of the cross section in the direction where the load f is applied is smaller than the geometrical-moment of inertia along the strong axis y, so that the high-strength side frame 1 is easily bent as compared with a case where a load is applied in the front-rear direction. In other words, in order to make the geometrical-moment of inertia along an axis, which inclines by the angle of θ relative to the strong axis y of the high-strength side frame 1, be equivalent to the geometrical-moment of inertia along the strong axis y, if an outline shape of the cross section is not changed, a thickness of a member constituting the cross section should be increased. This leads to a weight increase of the high-strength side frame 1.

In consideration of such a problem, an object of the disclosure is to provide a structure in which bending rigidity of a side frame is increased while an increase in weight is restrained, in terms of a back frame structure for a vehicle seat with a built-in seat belt.

A back frame structure for a vehicle seat according to a first aspect of the present disclosure includes a side frame extending in an up-down direction, wherein a webbing is disposed in the vehicle seat, and in a plan view, a direction along which a geometrical-moment of inertia of the side frame is at a maximum inclines toward an inner side of the vehicle seat with respect to a front-rear direction.

In a plan view, the direction along which a geometrical-moment of inertia of the side frame is at a maximum may coincide with a direction of a load to be applied to the side frame from the webbing at a time of a front collision of a vehicle.

According to the above aspect, at the time of a front collision of the vehicle, the load to be applied to the back frame from the webbing disposed in the vehicle seat is applied to the side frame. At this time, in a plan view, the direction along which the geometrical-moment of inertia of the side frame is at a maximum coincides with the direction of the load to be applied to the side frame from the webbing at the time of the front collision of the vehicle. Accordingly, it is possible to increase the bending rigidity of the side frame more effectively in comparison with a case where the direction, along which the geometrical-moment of inertia of the side frame is at a maximum, is placed so as to deviate from the direction of the load to be applied to the side frame from the webbing. That is, it is possible to provide a structure in which a weight increase is restrained and the bending rigidity of the side frame is increased.

A back frame structure for a vehicle seat according to a second aspect of the present disclosure includes: a first side frame and a second side frame extending in an up-down direction; and an upper frame connecting an upper end side of the first side frame to an upper end side of the second side frame in a bridged manner, wherein: a cross section of the first side frame is a uniform closed section or an open section in which the closed section is partially opened; a seat belt system from which a webbing is let out is disposed inside the vehicle seat; a webbing guide portion is disposed in a shoulder of the back frame on a side where the first side frame is placed; the webbing guide portion guides the webbing extending from behind of the back frame such that the webbing is routed over the back frame and extends obliquely downward along a front of the back frame; in a plan view, a strong axis of the first side frame coincides with a direction of a load to be applied to the first side frame from the webbing at a time of a front collision of a vehicle; and the strong axis of the first side frame is a principal axis of section along which a geometrical-moment of inertia of the first side frame is at a maximum.

According to the second aspect, at the time of the front collision of the vehicle, the load to be applied to the back frame from the webbing is mainly applied to the first side frame via the webbing guide portion. The webbing is let out form the seat belt system disposed inside the vehicle seat. At this time, a cross section of the first side frame is a uniform closed section or an open section in which the closed section is partially opened, and in a plan view, the strong axis coincides with the direction of the load to be applied to the first side frame from the webbing at the time of the front collision of the vehicle. The strong axis is a principal axis of section along which the geometrical-moment of inertia of the first side frame is at a maximum. Accordingly, it is possible to increase the bending rigidity of the first side frame more effectively in comparison with a case where the strong axis in the cross section of the first side frame is placed so as to deviate from the direction of the load that is applied to the first side frame from the webbing. That is, it is possible to provide a structure in which a weight increase is restrained and the bending rigidity of the side frame is increased.

A cross section of the first side frame may be a polygonal closed section.

According to the above aspect, the cross section of the first side frame is a polygonal closed section. Accordingly, at the time when a load is applied from the webbing to the back frame, a rotation of the first side frame relative to the upper frame is restrained and the first side frame can be attached firmly to the upper frame.

A cross section of the first side frame may have a rectangular basic shape.

According to the above aspect, by adjusting thicknesses of face portions perpendicular to the strong axis, it is possible to adjust the geometrical-moment of inertia along the strong axis without a change of an outline shape of the cross section. Such a change of an outline shape of the cross section requires a shape change of the upper frame, thus, the above aspect does not need a shape change of cross section.

A chamfer may be provided in the first side frame. The chamfer may be formed by chamfering a corner of a rectangular shape and the rectangular shape may be a basic shape of the cross section of the first side frame. The corner thus chamfered may abut with a back pad, which is a cushion body. The corner thus chamfered may be a corner directed toward a sitting occupant via the back pad.

According to the above aspect, it is possible to prevent a corner, which is a part of the rectangular shape, from providing discomfort to the sitting occupant due to abutment via the back pad in the cross section of the first side frame. The back pad is a cushion body.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

FIG. 1 to FIG. 9 illustrate one embodiment of the disclosure. The present embodiment is an example in which the disclosure is applied to a back frame (hereinafter just referred to as the back frame) for an automobile seat. In the drawings, respective arrows indicate respective directions of an automobile and an automobile seat at the time when the automobile seat is attached to a floor of the automobile. The back frame is attached to the automobile seat. In the following description, a description about a direction shall be performed on the basis of these directions.

Figure 1:
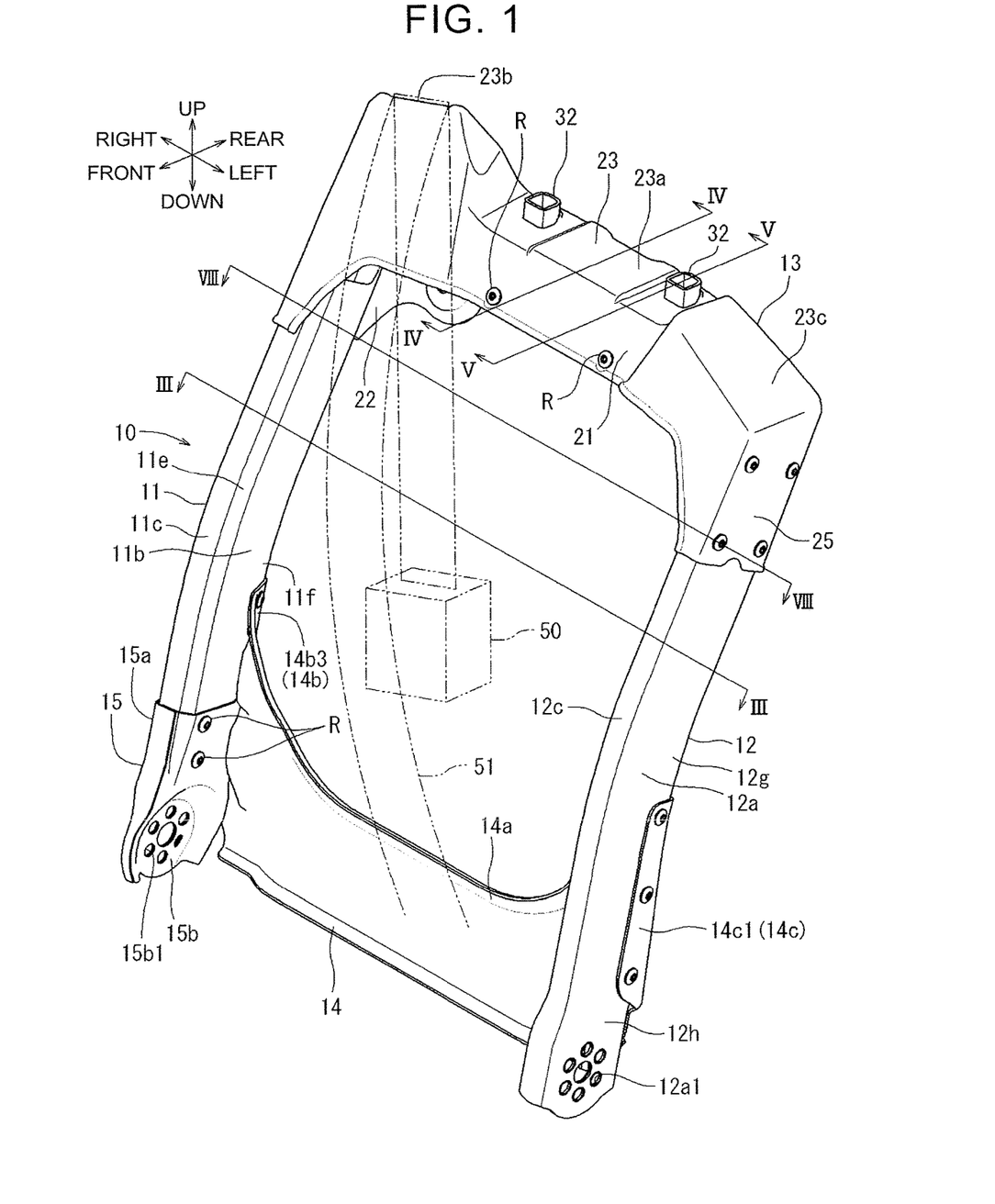
FIG. 1 is a perspective view of a back frame for a right automobile seat according to one embodiment of the disclosure.
Figure 2:
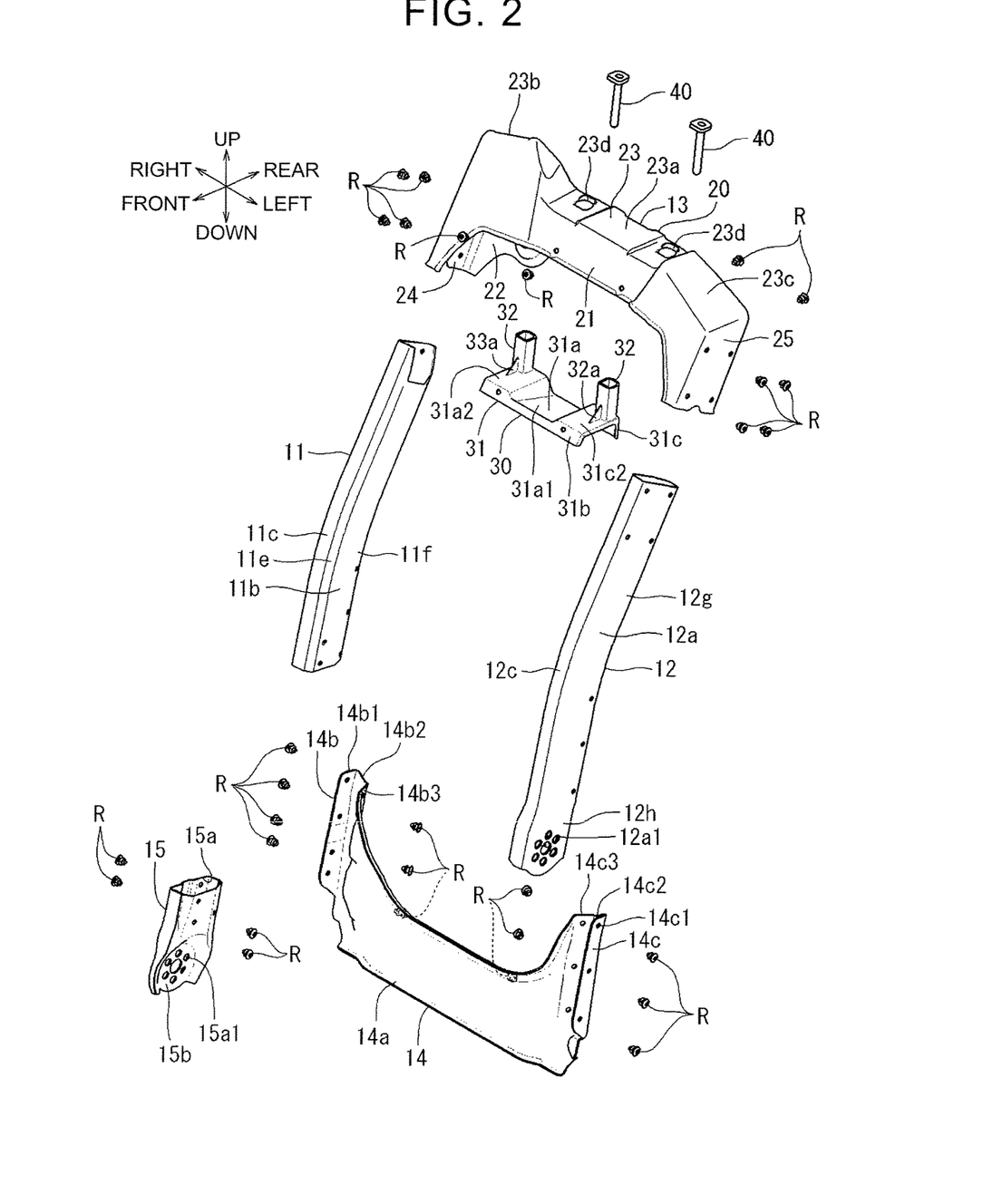
FIG. 2 is an exploded perspective view of the back frame of the above embodiment.

As illustrated in FIG. 1 and FIG. 2, a back frame 10 of the present embodiment is a back frame for a right automobile seat with a built-in seat belt, and a webbing winding apparatus 50 of a seat belt system can be attached thereto. The back frame 10 includes a right side frame 11 extending in an up-down direction, a left side frame 12 extending in the up-down direction, an upper frame 13 connecting respective upper end sides of the left side frame 12 and the right side frame 11 to each other, and a lower frame 14 connecting their respective lower end sides to each other. Here, the right side frame 11 and the left side frame 12 correspond to a "first side frame" and a "second side frame", respectively.

Figure 3:
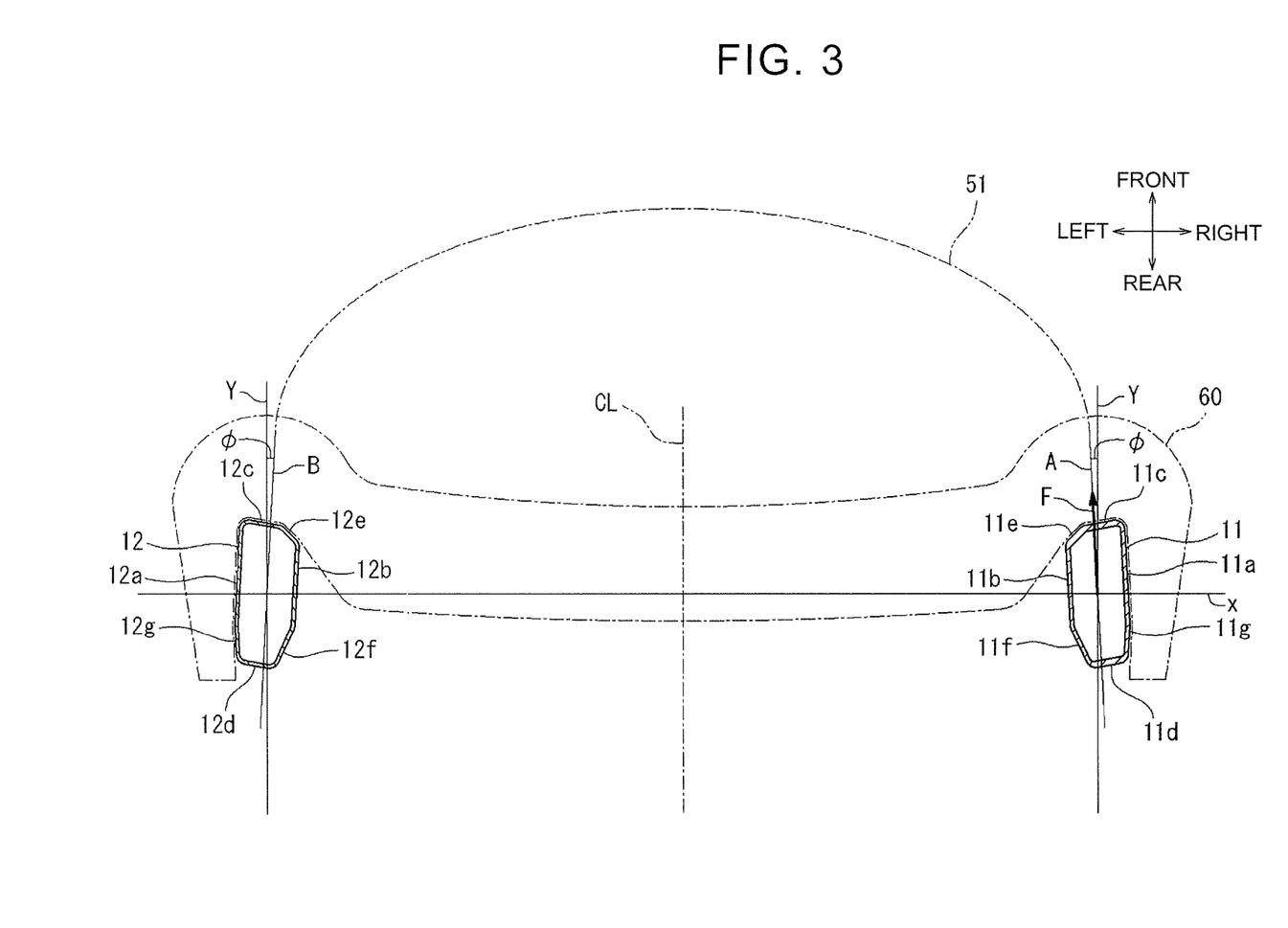
FIG. 3 is a sectional view taken along a line in FIG. 1.
Figure 4:
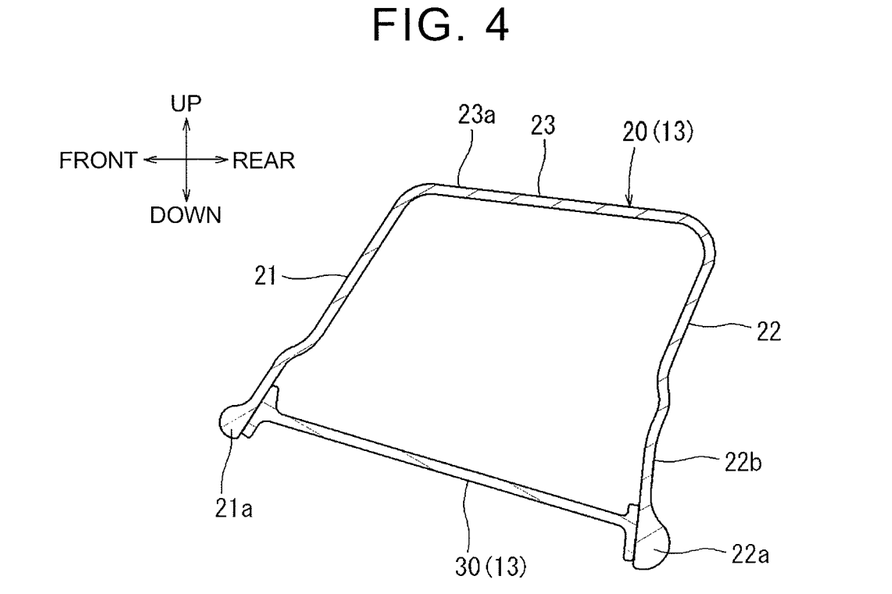
FIG. 4 is a sectional view taken along a line IV-IV in FIG. 1.
Figure 5:
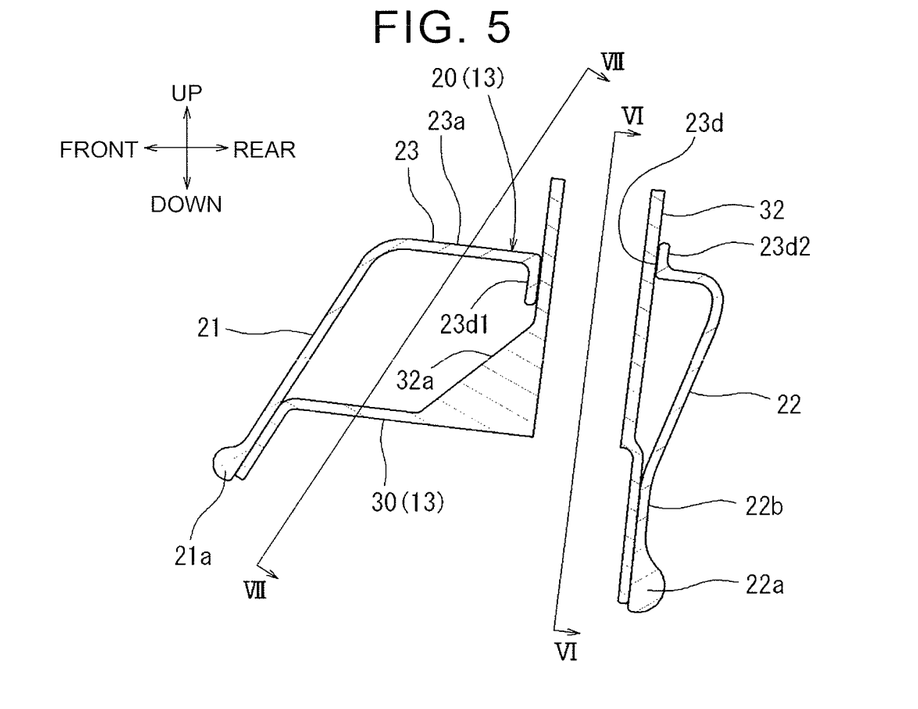
FIG. 5 is a sectional view taken along a line V-V in FIG. 1.
Figure 6:
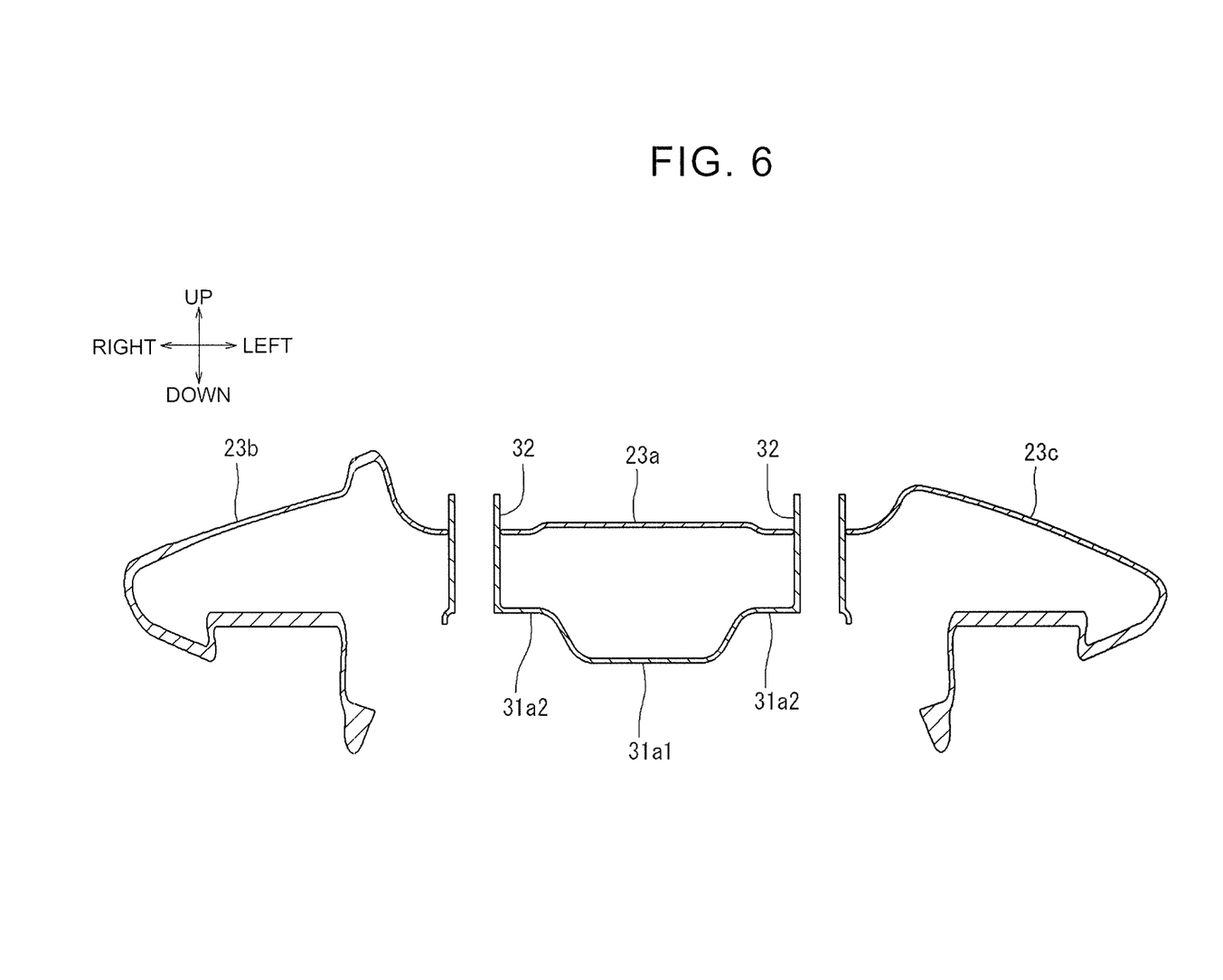
FIG. 6 is a sectional view taken along a line VI-VI in FIG. 5.

The right side frame 11 is made of an aluminum-alloy extruded material having a sectional shape as illustrated in FIG. 3 as a base material. In FIG. 3, a cross section of the right side frame 11 has a deformed heptagonal shape and a basic shape of the deformed heptagonal shape is a rectangular. The cross section of the right side frame 11 includes a right side face portion 11a, a left side face portion 11b, a front face portion 11c, a rear face portion 11d, a front left chamfer 11e, a rear left chamfer 11f, and a rear right chamfer 11g. The right side face portion 11a and the left side face portion 11b correspond to long sides of the rectangular shape of the basic shape, and extend parallel to each other. The right side face portion 11a and the left side face portion 11b are inclined slightly to the left (a seat inward direction) from a seat front-rear direction Y only by an angle of φ. The front face portion 11c and the rear face portion 11d correspond to short sides of the rectangular shape of the basic shape, and extend parallel to each other. The front face portion 11c and the rear face portion 11d are inclined slightly rearward from a seat right-left direction X by generally the angle of φ. That is, the right side face portion 11a, the left side face portion 11b, the front face portion 11c and the rear face portion 11d are in such a relationship that the front face portion 11c and the rear face portion 11d intersect with the right side face portion 11a and the left side face portion 11b generally at right angles. The front left chamfer 11e is a part that extends so as to connect a left end of the front face portion 11c to a front end of the left side face portion 11b and has an inclination angle of approximately 45 degrees relative to the left side face portion 11b. The rear left chamfer 11f is a part that extends so as to connect a left end of the rear face portion 11d to a rear end of the left side face portion 11b and has an inclination angle of approximately 30 degrees relative to the left side face portion 11b. The rear right chamfer 11g is a part that extends so as to connect a right end of the rear face portion 11d to a rear end of the right side face portion 11a and has an inclination angle of approximately 5 degrees relative to the right side face portion 11a. In a cross section of the right side frame 11, a strong axis A, which is a principal axis of section along which a geometrical-moment of inertia is at a maximum, is placed so as to be inclined leftward only by the angle of $\phi$ from the seat front-rear direction Y. That is, a direction along which a geometrical-moment of inertia of the right side frame 11 is at a maximum inclines toward an inner side of the vehicle seat with respect to a front-rear direction. Here, at the time of a front collision of the automobile, which will be described later, a direction of a load F is applied to the right side frame 11 from a webbing and the direction of the load F is along the strong axis A. Note that, in FIG. 3, a back pad 60 is a cushion material that covers the back frame 10, and a webbing 51 is a constituent component of the seat belt system and is intended to restrict a body of a sitting occupant.

The left side frame 12 is made of an aluminum-alloy extruded material having a sectional shape as illustrated in FIG. 3 as a base material. In FIG. 3, a cross section of the left side frame 12 has a deformed heptagonal shape and a basic shape of the deformed heptagonal shape is a rectangular. The cross section of the left side frame 12 includes a left side face portion 12a, a right side face portion 12b, a front face portion 12c, a rear face portion 12d, a front right chamfer 12e, a rear right chamfer 12f, and a rear left chamfer 12g. The left side face portion 12a and the right side face portion 12b correspond to long sides of the rectangular shape of the basic shape, and extend parallel to each other. The left side face portion 12a and the right side face portion 12b are inclined slightly to the right (a seat inward direction) from a seat front-rear direction Y only by an angle of $\phi$. The front face portion 12c and the rear face portion 12d correspond to short sides of the rectangular shape of the basic shape, and extend parallel to each other. The front face portion 12c and the rear face portion 12d are inclined slightly rearward from a seat right-left direction X by generally the angle of $\phi$. That is, the left side face portion 12a, the right side face portion 12b, the front face portion 12c and the rear face portion 12d are in such a relationship that the front face portion 12c and the rear face portion 12d intersect with the left side face portion 12a and the right side face portion 12b generally at right angles. The front right chamfer 12e is a part that extends so as to connect a right end of the front face portion 12c to a front end of the right side face portion 12b and has an inclination angle of approximately 45 degrees relative to the right side face portion 12b. The rear right chamfer 12f is a part that extends so as to connect a right end of the rear face portion 12d to a rear end of the right side face portion 12b and has an inclination angle of approximately 30 degrees relative to the right side face portion 12b. The rear left chamfer 12g is a part that extends so as to connect a left end of the rear face portion 12d to a rear end of the left side face portion 12a and has an inclination angle of approximately 5 degrees relative to the left side face portion 12a. In a cross section of the left side frame 12, a strong axis B, which is a principal axis of section along which a geometrical-moment of inertia is at a maximum, is placed so as to be inclined rightward only by the angle of $\phi$ from the seat front-rear direction Y. That is, a direction along which a geometrical-moment of inertia of the left side frame 12 is at a maximum inclines toward an inner side of the vehicle seat with respect to a front-rear direction.

As illustrated in FIG. 3, an outline of a cross sectional shape of the right side frame 11 and an outline of a cross sectional shape of the left side frame 12 have a relationship of a linear symmetry with respect to a center line CL of the back frame 10 in the right-left direction. Further, respective thicknesses of the right side face portion 11a and the left side face portion 11b of the right side frame 11 are generally the same as respective thicknesses of the left side face portion 12a and the right side face portion 12b of the left side frame 12. In the meantime, respective thicknesses of the front face portion 11c and the rear face portion 11d of the right side frame 11 are about twice as large as respective thicknesses of the front face portion 12c and the rear face portion 12d of the left side frame 12. The reason is as follows. A webbing guide portion 23b that guides the webbing 51 of the seat belt system is disposed in an upper part of the right side frame 11, and therefore, in order to resist the application of a larger bending load in the front-rear direction to the right side frame 11 than the left side frame 12, the right side frame 11 is formed so that its geometrical-moment of inertia is large. As illustrated in FIG. 1 and FIG. 2, the right side frame 11 and the left side frame 12 are formed by bending the extruded material having a uniform section so that the extruded material has a shape projecting forward near a central part of the extruded material in the up-down direction. Further, an upper arm 15, which is an iron press component, is attached to a lower end side of the right side frame 11. The upper arm 15 is a component formed by combining two components as one component in a sandwich state. An upper part of the upper arm 15 is formed as a side frame connection portion 15a such that an inner shape line of a horizontal section of the upper part of the upper arm 15 corresponds to the outline of the cross sectional shape of the right side frame 11. Further, a lower part of the upper arm 15 is formed as a flat-shaped recliner connection portion 15b. The lower part of the upper arm 15 is provided with recliner communicating holes 15b1. In a state where the lower end side of the right side frame 11 is inserted into the side frame connection portion 15a of the upper arm 15, the lower end side of the right side frame 11 is connected to the side frame connection portion 15a with four rivets R being fastened. A recliner connection portion 12h is formed in the lower end side of the left side frame 12 such that the front face portion 12c is expanded forward and recliner communicating holes 12a1 are formed in the recliner connection portion 12h. A recliner is attached to the left side face portion 12a via the recliner communicating holes 12a1.

Figure 9:
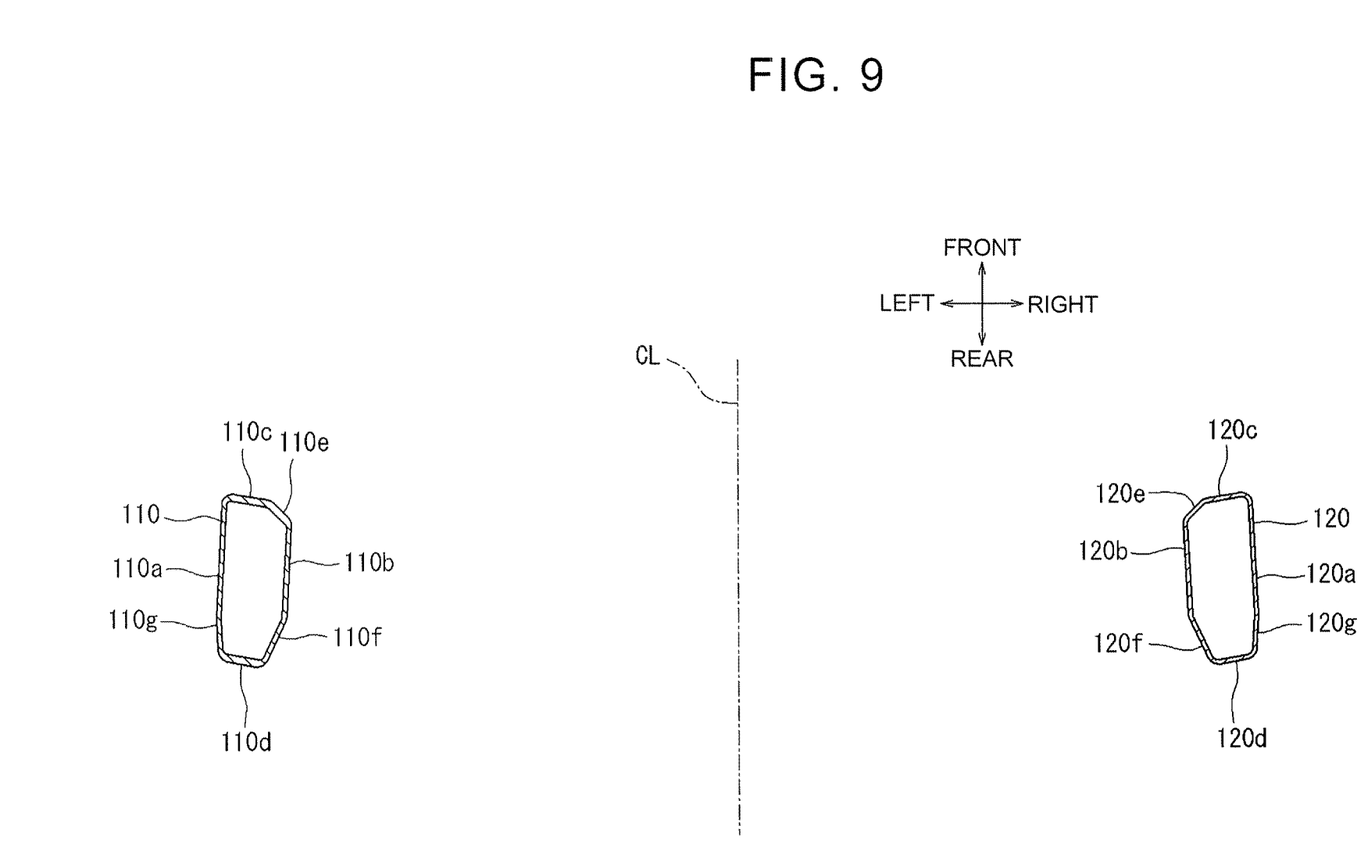
FIG. 9 is an end elevational view of a back frame for a left automobile seat, corresponding to FIG. 3.

FIG. 9 illustrates sectional shapes of a right side frame 120 and a left side frame 110 of a left automobile seat, corresponding to FIG. 3. The sectional shapes in FIG. 9 are in such a relationship that right and left in the sectional shapes in FIG. 3 are replaced with each other across a center line CL in the right-left direction. That is, respective face portions 11a to 11f of the right side frame 11 of the right automobile seat correspond to respective face portions 110a to 110f of the left side frame 110 of the left automobile seat. Further, respective face portions 12a to 12f of the left side frame 12 of the right automobile seat correspond to respective face portions 120a to 120f of the right side frame 120 of the left automobile seat. Hereby, the right side frame 11 and the left side frame 110 can be formed by using aluminum-alloy extruded materials that have the same section and the aluminum-alloy extruded materials are set upside-down to each other when being used for forming the right side frame 11 and the left side frame 110. Further, the left side frame 12 and the right side frame 120 can be formed by using aluminum-alloy extruded materials that have the same section and the aluminum-alloy extruded materials are set upside-down to each other when being used for forming the left side frame 12 and the right side frame 120. That is, the side frames for the right and left automobile seats can be formed by using two types of aluminum-alloy extruded materials. Note that, in the left automobile seat, the right side frame 120 and the left side frame 110 correspond to the "second side frame" and the "first side frame", respectively.

As illustrated in FIG. 1, FIG. 2 and FIG. 4 to FIG. 7, the upper frame 13 includes a body portion 20 having a generally reverse U-shaped cross section and the body portion 20 is opened downward. The upper frame 13 also includes a cover member 30 attached to a central part on a lower side of the opening of the body portion 20 so as to cover the opening of the body portion 20. The body portion 20 is a fiber-reinforced composite molded product which is obtained by laminating a plurality of carbon fiber cloths and hardening the laminated carbon fiber cloths with matrix resin of epoxy resin. The body portion 20 includes a front wall portion 21, a rear wall portion 22, an upper wall portion 23, a right wall portion 24, and a left wall portion 25.

The upper wall portion 23 includes a central portion 23a positioned in the center of the upper wall portion 23 in the right-left direction. The upper wall portion 23 also includes the webbing guide portion 23b positioned on a right end side, and a pedestal portion 23c positioned on a left end side. The central portion 23a is a face portion extending in a generally horizontal direction in a standard state where the back frame 10 rises relative to the rear part of a cushion frame. The generally horizontal direction is a direction generally perpendicular to the after-mentioned holder portion 32. A pair of holder insertion holes 23d are formed in the central portion 23a at symmetric positions in terms of a center plane in the right-left direction and the holder insertion holes 23d penetrate the central portion 23a in the up-down direction. In a peripheral portion of the holder insertion hole 23d, a front upright wall portion 23d1 mainly supporting a front face portion side of the holder portion 32 is provided so as to stand downward, and a rear upright wall portion 23d2 mainly supporting a rear face portion side of the holder portion 32 is provided so as to stand upward. More specifically, the front upright wall portion 23d1 is disposed generally in a U-shape from a front edge part of the peripheral portion of the holder insertion hole 23d to both side parts thereof in a plan view, and the rear upright wall portion 23d2 is disposed generally in a U-shape from a rear edge part of the peripheral portion of the holder insertion hole 23d to both side parts thereof in a plan view. The webbing guide portion 23b is a mound-shaped part protruding upward and the mound-shaped part has an edge line inclined toward a right downward side in the right-left direction. The webbing guide portion 23b has a function to guide the webbing 51 from a back face of the back frame 10 toward a front face of an upper body of the sitting occupant. The webbing 51 is let out from the webbing winding apparatus 50 disposed inside the seatback. The pedestal portion 23c is a table-shape part protruding slightly upward relative to the central portion 23a, and is intended to form the shape of a shoulder of the seatback. Whether the webbing guide portion 23b is formed on the right side or on the left side can be selected by attaching a nest portion (not shown) on the right side or on the left side in a molding die for the upper frame 13, and whether the pedestal portion 23c is formed on the right side or on the left side also can be selected by detaching the nest portion (not shown) from the right side or from the left side in the molding die for the upper frame 13. That is, a part which is molded by attaching the nest portion (not shown) to the molding die for the upper frame 13 serves as the pedestal portion 23c, and a part which is molded without attaching the nest portion serves as the webbing guide portion 23b. In the body portion 20 of the left automobile seat, the webbing guide portion 23b is placed on the left end portion side and the pedestal portion 23c is placed on the right end portion side. That is, the webbing guide portion 23b is placed on a vehicle outer side in either case of the right seat and the left seat.

The front wall portion 21 extends toward the forward lower side, making an obtuse angle relative to the central portion 23a of the upper wall portion 23. Further, when the upper frame 13 is connected to the right side frame 11 and the left side frame 12, the front wall portion 21 extends so as to be generally parallel to the front face portion 11c and the front face portion 12c in upper parts of the right side frame 11 and the left side frame 12. A thickened part 21a to increase the rigidity of an end portion is provided in a lower end of the front wall portion 21. When the upper frame 13 is connected to the right side frame 11 and the left side frame 12, the rear wall portion 22 extends so as to be generally parallel to the rear face portion 11d and the rear face portion 12d in the upper parts of the right side frame 11 and the left side frame 12. That is, the front wall portion 21 and the rear wall portion 22 extend toward the forward lower side and substantially parallel to each other. In the rear wall portion 22, a part corresponding to the central portion 23a of the upper wall portion 23 is configured such that its lower part extends downward and extends generally perpendicularly to the upper wall portion 23, and a connecting face portion 22b is formed. The after-mentioned rear wall face portion 31c of the cover member 30 is connected to the connecting face portion 22b. A thickened part 22a to increase the rigidity of the end portion is provided in a lower end of the rear wall portion 22. A right end of the upper wall portion 23, a right end of the front wall portion 21, and a right end of the rear wall portion 22 are connected together via the right wall portion 24, and a left end of the upper wall portion 23, a left end of the front wall portion 21, and a left end of the rear wall portion 22 are connected together via the left wall portion 25. The upper wall portion 23, the front wall portion 21, the rear wall portion 22, the right wall portion 24, and the left wall portion 25 are formed as the body portion 20 having a generally box shape that is opened downward.

Figure 8:
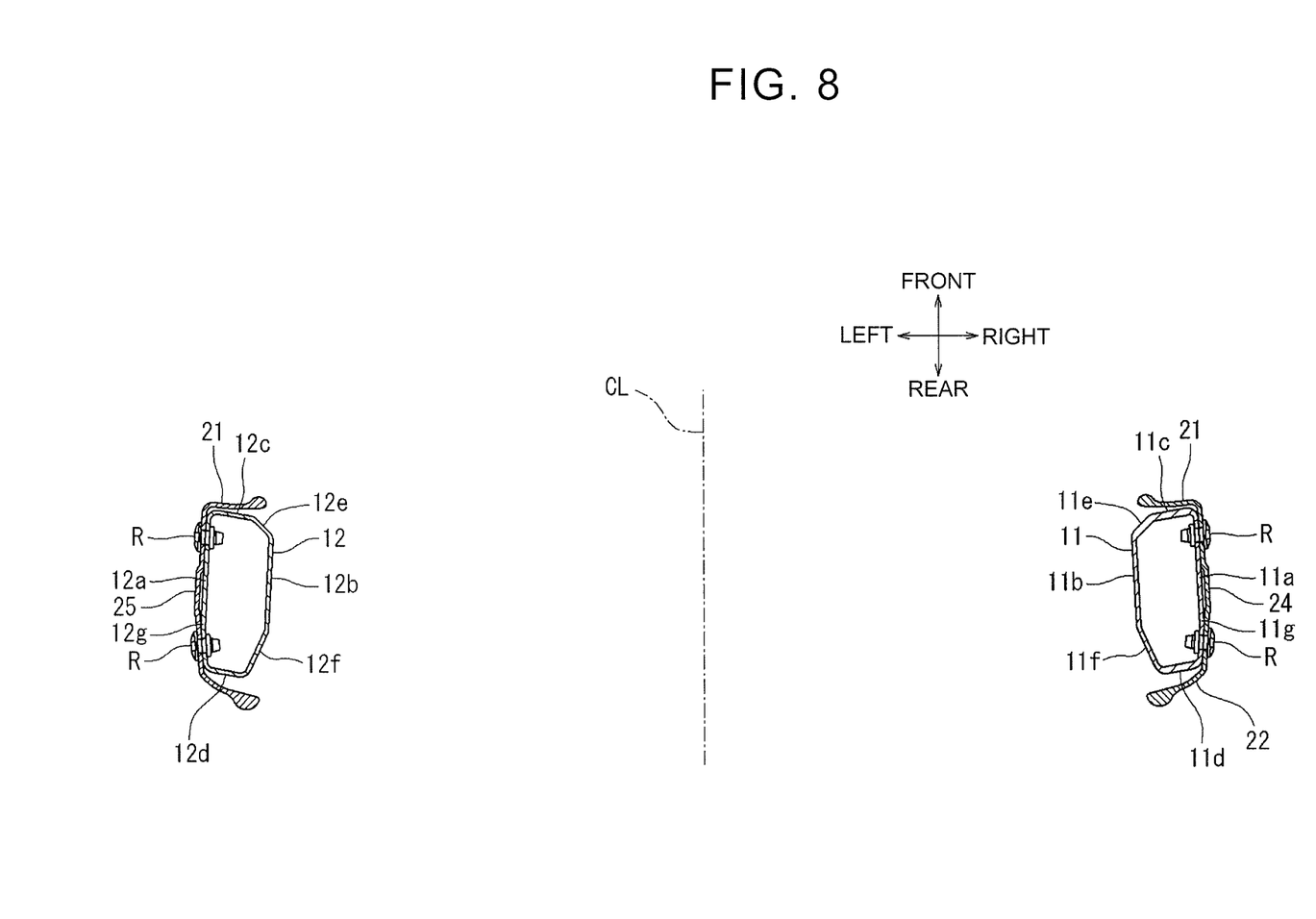
FIG. 8 is a sectional view taken along a line VIII-VIII in FIG. 1.

As illustrated in FIG. 1 and FIG. 8, when the upper frame 13 is placed to cover the upper end side of the right side frame 11 and the upper end side of the left side frame 12 from the upper side, a left side surface of the right wall portion 24 is formed so as to abut with a right side surface of the right side face portion 11a of the right side frame 11 and a right side surface of the rear right chamfer 11g of the right side frame 11. Further, when the upper frame 13 is placed to cover the upper end side of the right side frame 11 and the upper end side of the left side frame 12 from the upper side, a right side surface of the left wall portion 25 is formed so as to abut with a left side surface of the left side face portion 12a of the left side frame 12 and a left side surface of the rear left chamfer 12g of the left side frame 12. Note that, with reference to FIG. 9, the left side surface of the right wall portion 24 can abut with a right side surface of the right side face portion 120a of the right side frame 120 for the left automobile seat and a right side surface of the rear right chamfer 120g of the right side frame 120 for the left automobile seat. Also, the right side surface of the left wall portion 25 can abut with a left side surface of the left side face portion 110a of the left side frame 110 for the left automobile seat and a left side surface of the rear left chamfer 110g of the left side frame 110 for the left automobile seat.

As illustrated in FIG. 2 and FIG. 4 to FIG. 7, the cover member 30 is a die-cast molded product of aluminum. The cover member 30 includes a base portion 31 which has a generally rectangular shape in a plan view. The cover member 30 also includes a pair of holder portions 32 which are provided in a standing manner on rear sides of right and left ends of the base portion 31 and either of the holder portions 32 has a shape of square tube. The base portion 31 includes an upper wall face portion 31a, a front wall face portion 31b, and a rear wall face portion 31c. The upper wall face portion 31a is provided with a recessed face portion 31a1 in its central part in the right-left direction. The upper wall face portion 31a is also provided with projection face portions 31a2 which protrude in a table shape and are provided on both right and left sides of the recessed face portion 31a1. The holder portion 32 is provided in a standing manner on the rear side of the projecting face portion 31a2, and an inner cylinder part of the holder portion 32 is formed in a penetrating manner in the up-down direction, so that a headrest support 40 can be inserted therein. A diagonal-bracing wall 32a, which is provided to stably hold the holder portion 32 relative to the projecting face portion 31a2, is provided between a front face portion of the holder portion 32 and the projecting face portion 31a2.

As illustrated in FIG. 2 and FIG. 4 to FIG. 7, the cover member 30 is assembled to the body portion 20 in a state where respective upper end sides of the pair of holder portions 32 are inserted into the pair of holder insertion holes 23d of the body portion 20 from the lower side. More specifically, in a state where about ⅓ of a vertical length of the holder portion 32 from its upper end is exposed from a top face of the central portion 23a, the lower end side of the front wall portion 21 of the body portion 20 is brought into contact with the front wall face portion 31b of the cover member 30, and the front wall face portion 31b is fixed to the front wall portion 21 with two rivets R being fastened. Further, in the same state, the connecting face portion 22b of the rear wall portion 22 of the body portion 20 is brought into contact with the rear wall face portion 31c of the cover member 30, and the rear wall face portion 31c is fixed to the rear wall portion 22 with two rivets R being fastened. Hereby, the cover member 30 is fixed to the front wall portion 21 and the rear wall portion 22 corresponding to the central portion 23a of the upper wall portion 23 of the body portion 20, so as to form a closed-section structure in that part. At this time, the pair of holder portions 32 of the cover member 30 are mainly supported from the front side and the rear side respectively by the front upright wall portion 23d1 and the rear upright wall portion 23d2 of the body portion 20.

As illustrated in FIG. 1 and FIG. 2, the lower frame 14 has a generally U-shape in a front view and is a fiber-reinforced composite molded product which is obtained by laminating a plurality of carbon fiber cloths and hardening the laminated carbon fiber cloths with matrix resin of epoxy resin. The lower frame 14 includes a main portion 14a, a right connection portion 14b, and a left connection portion 14c. The right connection portion 14b is disposed on the right side of the main portion 14a and also serves as a connecting portion between the lower end side of the right side frame 11 and the upper arm 15. The left connection portion 14c serves as a connection portion with the lower end side of the left side frame 12. A rib (not shown) is provided in the main portion 14a so that the rigidity of the main portion 14a is raised. The right connection portion 14b is formed such that its section cut in a horizontal plane is opened forward in a generally U-shape. The right connection portion 14b includes a right face portion 14b1, a rear face portion 14b2, and a left face portion 14b3 corresponding to the rear right chamfer 11g, the rear face portion 11d, and the rear left chamfer 11f of the right side frame 11, respectively. The left connection portion 14c is formed such that its section cut in a horizontal plane is opened forward in a generally U-shape. The left connection portion 14c includes a left face portion 14c1, a rear face portion 14c2, and a right face portion 14c3 corresponding to the rear left chamfer 12g, the rear face portion 12d, and the rear right chamfer 12f of the left side frame 12, respectively. Further, with reference to FIG. 9, in the back frame 10 for the left automobile seat, the right face portion 14b1, the rear face portion 14b2, and the left face portion 14b3 correspond to the rear right chamfer 120g, the rear face portion 120d, and the rear left chamfer 120f of the right side frame 120, respectively. Further, the left face portion 14c1, the rear face portion 14c2, and the right face portion 14c3 correspond to the rear left chamfer 110g, the rear face portion 110d, and the rear right chamfer 110f of the left side frame 110, respectively. That is, the lower frame 14 is able to be used both in the back frame 10 for the right automobile seat and in the back frame 10 for the left automobile seat.

Figure 7:
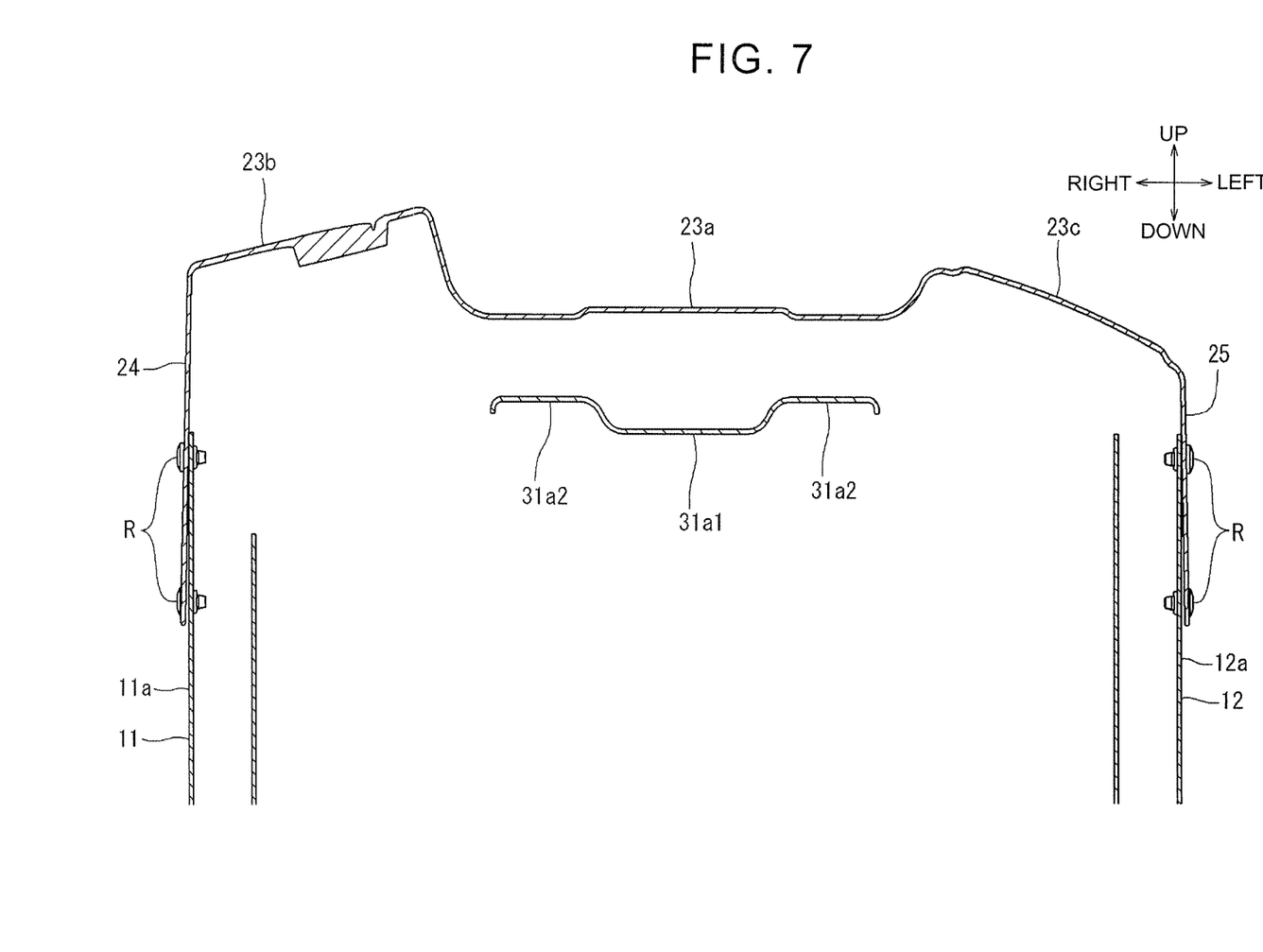
FIG. 7 is a sectional view taken along a line VII-VII in FIG. 5.

As illustrated in FIG. 1, FIG. 2 and FIG. 7, the upper frame 13 is placed to cover the upper end side of the right side frame 11 and the upper end side of the left side frame 12 from the upper side. In this state, the right wall portion 24 is brought into contact with the right side face portion 11a of the right side frame 11 and the rear right chamfer 11g of the right side frame 11, and the right wall portion 24 is fixed to the right side face portion 11a and the rear right chamfer 11g with four rivets R being fastened. Also, the left wall portion 25 of the upper frame 13 is brought into contact with the left side face portion 12a of the left side frame 12 and the rear left chamfer 12g of the left side frame 12, and the left wall portion 25 is fixed to the left side face portion 12a and the rear left chamfer 12g with four rivets R being fastened. Subsequently, in a state where the upper arm 15 is attached to the lower end side of the right side frame 11, the right connection portion 14b of the lower frame 14 is placed to cover the lower end side of the right side frame 11 from the rear side, such that the rear right chamfer 11g of the right side frame 11 is brought into contact with the right face portion 14b1 of the lower frame 14 so as to be fixed thereto with four rivets R being fastened. Further, in the same state, the rear left chamfer 11f of the right side frame 11 is brought into contact with the left face portion 14b3 of the lower frame 14 so as to be fixed thereto with three rivets R being fastened. Subsequently, the left connection portion 14c of the lower frame 14 is placed to cover the lower end side of the left side frame 12 from the rear side, such that the rear left chamfer 12g of the left side frame 12 is brought into contact with the left face portion 14c1 of the lower frame 14 so as to be fixed thereto with three rivets R being fastened. Further, in the same state, the rear right chamfer 12f of the left side frame 12 is brought into contact with the right face portion 14c3 of the lower frame 14 so as to be fixed thereto with three rivets R being fastened. Thereby, the left side frame 12, the right side frame 11, the upper frame 13, and the lower frame 14 are connected together, so that the back frame 10 having a generally rectangular in a front view is formed. Note that, in the back frame 10, the recliner connection portion 15b of the upper arm 15 and the recliner connection portion 12h of the left side frame 12 are attached to a rear end side of a seat cushion frame (not shown) via respective recliners (not shown).

The present embodiment thus configured has the following effects. At the time of a front collision of the automobile, a load F to be applied to the back frame 10 is mainly applied to the right side frame 11 via the webbing guide portion 23b. The load F is applied from the webbing 51 which is let out from the seat belt system disposed inside the automobile seat. At this time, as illustrated in FIG. 3, in a plan view, the strong axis A of the right side frame 11 coincides with the direction of the load F to be applied to the right side frame 11 from the webbing 51 at the time of the front collision of the automobile. The strong axis A is a principal axis of section along which the geometrical-moment of inertia of the right side frame 11 is at a maximum. Accordingly, it is possible to increase the bending rigidity of the right side frame 11 more effectively in comparison with a case where the strong axis A in the cross section of the right side frame 11 is placed so as to deviate from the direction of the load F to be applied to the right side frame 11 from the webbing 51. That is, it is possible to provide a structure in which a weight increase is restrained and the bending rigidity of the right side frame 11 is increased.

Further, the cross section of the right side frame 11 has a polygonal shape. Accordingly, at the time when a load is applied from the webbing 51 to the back frame, a rotation of the right side frame 11 relative to the upper frame 13 is restrained and the right side frame 11 can be attached firmly to the upper frame 13. Further, the cross section of the right side frame 11 has a basic shape that is rectangular. Accordingly, by adjusting the thicknesses of the front face portion 11c and the rear face portion 11d, which are face portions perpendicular to the strong axis A, it is possible to adjust the geometrical-moment of inertia along the strong axis A without a change of the outline shape of the cross section. Such a change of an outline shape of the cross section requires a shape change of the upper frame, thus, the present embodiment does not need a shape change of cross section. In addition, the front left chamfer 11e is provided in the cross section of the right side frame 11, so it is possible to prevent a corner, which is a part of the rectangular shape, from providing discomfort to a sitting occupant via the back pad 60. The back pad 60 is a cushion body.

A specific embodiment has been described above, but the embodiment is not limited to the appearance and the configuration thereof, and various modifications, additions, and deletions are performable as far as they do not change a gist of the disclosure. For example, the following modifications are included.

In the above embodiment, the outline of the cross section of the right side frame 11 and the outline of the cross section of the left side frame 12 have a relationship of a linear symmetry with respect to the center line CL of the back frame 10 in the right-left direction. Alternatively, the cross section of the right side frame 11 and the cross section of the left side frame 12 may have a relationship of a linear symmetry with respect to the center line CL of the back frame 10 in the right-left direction. That is, a thickness of the front face portion 11c of the right side frame 11 and a thickness of the rear face portion 11d of the right side frame 11 may be the same as a thickness of the front face portion 12c of the left side frame 12 and a thickness of the rear face portion 12d of the left side frame 12 respectively. A structure of the left side frame 12 is not limited in particular.

In the above embodiment, the right side face portion 11a and the left side face portion 11b, which are long sides of the generally rectangular shape of the cross section of the right side frame 11, are placed parallel to the load-F direction, and the front face portion 11c and the rear face portion 11d, which are face portions in the front-rear direction, are formed to be thick so as to constitute the strong axis A. Alternatively, the cross sectional shape may be formed in any shapes, provided that the strong axis A can be formed along the load-F direction.

In the above embodiment, the right side frame 11 is made of an aluminum-alloy extruded material having a uniform sectional shape as a base material. Alternatively, the right side frame 11 may be made of iron having a uniform sectional shape or may be made of fiber reinforced composite resin, such as carbon and glass, that has a uniform sectional shape.

In the above embodiment, the disclosure is applied to a seat for an automobile, but may be applied to seats to be provided in an airplane, a ship, a train, and the like.

What is claimed is:

1. A back frame structure for a vehicle seat, comprising a side frame extending in an up-down direction, wherein:
   a webbing is disposed in the vehicle seat; and
   in a plan view, a direction along which a geometrical-moment of inertia of the side frame is at a maximum inclines toward an inner side of the vehicle seat with respect to a front-rear direction,
   wherein in a plan view, the direction along which a geometrical-moment of inertia of the side frame is at a maximum coincides with a direction of a load to be applied to the side frame from the webbing at a time of a front collision of a vehicle, and
   wherein a cross section of the side frame is a polygonal closed section.

2. The back frame structure according to claim 1, wherein:
   in a plan view, a strong axis of the side frame coincides with the direction of the load to be applied to the side frame from the webbing at the time of the front collision of the vehicle; and
   the strong axis of the side frame is a principal axis of section along which the geometrical-moment of inertia of the side frame is at a maximum.

3. The back frame structure according to claim 1, wherein the side frame includes a first side frame and a second side frame extending in the up-down direction.

4. The back frame structure according to claim 3, wherein:
   a webbing guide portion is disposed in a shoulder of the back frame on a side where the first side frame is placed; and
   the webbing guide portion guides the webbing extending from behind of the back frame such that the webbing is routed over the back frame and extends obliquely downward along a front of the back frame.

5. The back frame structure according to claim 4, wherein:
   in a plan view, a strong axis of the first side frame coincides with a direction of a load to be applied to the first side frame from the webbing at the time of the front collision of the vehicle; and
   the strong axis of the first side frame is a principal axis of section along which a geometrical-moment of inertia of the first side frame is at a maximum.

6. The back frame structure according to claim 5, wherein a cross section of the first side frame is a uniform closed section or an open section in which the closed section is partially opened.

7. The back frame structure according to claim 3, further comprising an upper frame connecting an upper end side of the first side frame to an upper end side of the second side frame in a bridged manner.

8. The back frame structure according to claim 1, wherein a cross section of the side frame has a rectangular basic shape.

9. The back frame structure according to claim 1, wherein:
a chamfer is provided in the side frame;
the chamfer is formed by chamfering a corner of a rectangular shape; and
the rectangular shape is a basic shape of a cross section of the side frame.

10. The back frame structure according to claim 9, wherein the corner thus chamfered abuts with a back pad, which is a cushion body.

11. The back frame structure according to claim 10, wherein the corner thus chamfered is a corner directed toward a sitting occupant via the back pad.

12. The back frame structure according to claim 1, wherein the webbing is let out from a seat belt system disposed inside the vehicle seat.

13. A back frame structure for a vehicle seat, comprising:
a first side frame and a second side frame extending in an up-down direction; and
an upper frame connecting an upper end side of the first side frame to an upper end side of the second side frame in a bridged manner, wherein:
a cross section of the first side frame is a uniform closed section or an open section in which the closed section is partially opened;
a seat belt system from which a webbing is let out is disposed inside the vehicle seat;
a webbing guide portion is disposed in a shoulder of the back frame on a side where the first side frame is placed;
the webbing guide portion guides the webbing extending from behind of the back frame such that the webbing is routed over the back frame and extends obliquely downward along a front of the back frame;
in a plan view, a strong axis of the first side frame coincides with a direction of a load to be applied to the first side frame from the webbing at a time of a front collision of a vehicle; and
the strong axis of the first side frame is a principal axis of section along which a geometrical-moment of inertia of the first side frame is at a maximum,
wherein a cross section of the first side frame is a polygonal closed section.

14. The back frame structure according to claim 13, wherein a cross section of the first side frame has a rectangular basic shape.

15. The back frame structure according to claim 13, wherein:
a chamfer is provided in the first side frame;
the chamfer is formed by chamfering a corner of a rectangular shape; and
the rectangular shape is a basic shape of the cross section of the first side frame.

16. The back frame structure according to claim 15, wherein the corner thus chamfered abuts with a back pad, which is a cushion body.

17. The back frame structure according to claim 16, wherein the corner thus chamfered is a corner directed toward a sitting occupant via the back pad.

18. A back frame structure for a vehicle seat, comprising a side frame extending in an up-down direction, wherein:
a webbing is disposed in the vehicle seat; and
in a plan view, a direction along which a geometrical-moment of inertia of the side frame is at a maximum inclines toward an inner side of the vehicle seat with respect to a front-rear direction, wherein:
a chamfer is provided in the side frame;
the chamfer is formed by chamfering a corner of a rectangular shape; and
the rectangular shape is a basic shape of a cross section of the side frame.

19. The back frame structure according to claim 18, wherein the corner thus chamfered abuts with a back pad, which is a cushion body.

20. The back frame structure according to claim 19, wherein the corner thus chamfered is a corner directed toward a sitting occupant via the back pad.

21. A back frame structure for a vehicle seat, comprising:
a first side frame and a second side frame extending in an up-down direction; and
an upper frame connecting an upper end side of the first side frame to an upper end side of the second side frame in a bridged manner, wherein:
a cross section of the first side frame is a uniform closed section or an open section in which the closed section is partially opened;
a seat belt system from which a webbing is let out is disposed inside the vehicle seat;
a webbing guide portion is disposed in a shoulder of the back frame on a side where the first side frame is placed;
the webbing guide portion guides the webbing extending from behind of the back frame such that the webbing is routed over the back frame and extends obliquely downward along a front of the back frame;
in a plan view, a strong axis of the first side frame coincides with a direction of a load to be applied to the first side frame from the webbing at a time of a front collision of a vehicle; and
the strong axis of the first side frame is a principal axis of section along which a geometrical-moment of inertia of the first side frame is at a maximum, wherein:
a chamfer is provided in the first side frame;
the chamfer is formed by chamfering a corner of a rectangular shape; and
the rectangular shape is a basic shape of the cross section of the first side frame.

22. The back frame structure according to claim 21, wherein the corner thus chamfered abuts with a back pad, which is a cushion body.

23. The back frame structure according to claim 22, wherein the corner thus chamfered is a corner directed toward a sitting occupant via the back pad.

* * * * *